Nov. 3, 1953 H. HOPPER 2,657,953
SPRAY NOZZLE
Filed Sept. 7, 1950
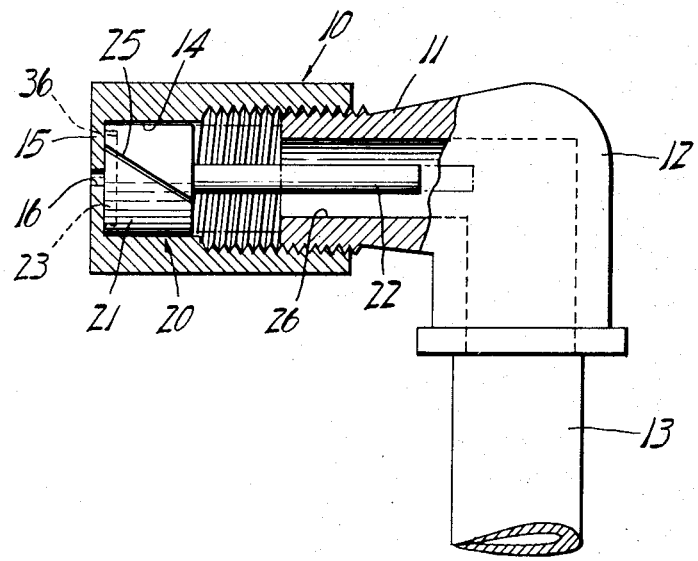
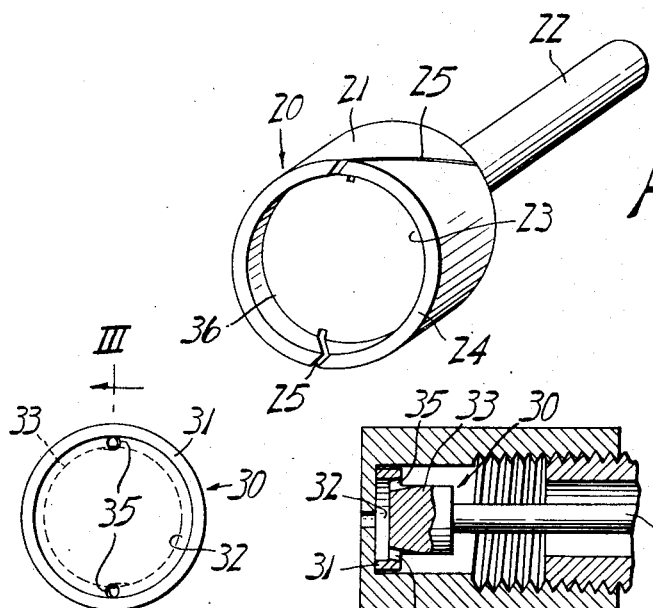
Inventor
Harold Hopper
By
Bean, Brooks, Buckley & Bean
Attorneys Patented Nov. 3, 1953

2,657,953

UNITED STATES PATENT OFFICE 2,657,953

SPRAY NOZZLE

Harold Hopper, Denver, Colo.

Application September 7, 1950, Serial No. 183,621

1 Claim. (Cl. 299—120)

My invention relates in general to nozzles used for spraying liquid under pressure, and particularly to the swirl-producing member of a nozzle of this type.

The principal object of my invention is to provide a spray nozzle having a swirl member so designed that the nozzle may be used over long periods of time without becoming inoperative by reason of corrosion or the accumulation of foreign matter.

A further object is to provide a nozzle having a swirl member which is free to float and to move axially with respect to the nozzle body when no pressure is applied to the nozzle, but which shall be sealed against said body and prevented from rotating therewith under conditions of high nozzle pressure.

Another object is to provide a swirl member formed at its forward end with an annular swirl recess which is in communication with the helically arranged passageways formed in the head of the member, whereby annular spaces are provided in the recess between the passageways for the accumulation of foreign matter.

A further object is to provide a device of this nature so designed that a stop is provided for the rearward movement of the swirl member.

Moreover, weight of the swirl member and the pitch of the helically arranged fluid passageways formed therein are so proportioned that the developed torque imposed thereon by the fluid passing through the member will counteract the tendency of the fluid under pressure to impell the swirl in a circular direction.

Furthermore, my device is so designed that it may be used to spray abrasive materials.

The above objects and advantages have been accomplished by a device shown in the accompanying drawing of which:

Fig. 1 is an enlarged sectional view of my invention;

Fig. 2 is an enlarged perspective view of the swirl member valve of my device;

Fig. 3 is an enlarged side elevation of a modified type of swirl member;

Fig. 4 a face view of the swirl member of Fig. 3.

Referring to the form of invention shown in Figs. 1 and 2, my invention comprises a nozzle body 10 which, for purposes of illustration, is shown screwthreaded to the end 11 of a nozzle elbow 12, but which will be screwthreaded directly to the fluid conduit in a straight nozzle construction (not shown).

The nozzle body 10 is formed forwardly of the interior screwthreads with a bore 14 which terminates short of the end of the body, whereby a flat nozzle disc 15 is provided. The spray orifice 16 is formed in the disc 15 and is located centrally of the bore 14. Slidably mounted within the bore 14 is the swirl-producing member 20 of my invention. This member comprises a head 21 of such diameter as to freely float axially within the bore 14 of the body, the clearance between the head and the bore being such that the device will function properly over long periods of time without attention even in conditions where corrosion may occur due to the use of hard water. The head is of such length that it can not move out of alignment to such a degree as to cause it to bind within the bore of the nozzle. Extending rearwardly from the head is a stem 22 which is preferably of such length as to project slightly beyond the end of the nozzle body, whereby the member may be grasped by the fingers when removing it from the body.

The forward end of the head is provided with a cylindrical flange 24 extending forward from the front end of the head, thereby forming a swirl chamber or cup 23. Under normal working conditions, the flange 24 of the member head will be non-rotatably pressed against the nozzle disc 15 in sealing contact therewith by means of the pressure of the fluid. Formed in the periphery of the head is a plurality of helically disposed grooves 25 each of which extends from the rear end of the head and opens into the swirl chamber at the forward end thereof. These grooves are preferably of such depth that they will extend through and inwardly beyond inner periphery of the flange 24.

As shown in Fig. 1, the supply aperture 26 formed in the forward end of the nozzle elbow is smaller than the diameter of the plunger head, whereby the end surface of the elbow will form a stop for the rearward movement of the swirl member.

Referring now to the form of invention shown in Figs. 3 and 4 the swirl member 30 is formed with a relatively narrow peripheral flange 31 adjacent to which is a reduced portion 33. The stem 34 in this form is carried by the reduced portion 33. The flange is extended forwardly beyond the end of the reduced portion, thereby forming a swirl chamber 32. The reduced portion 33 of the head is preferably of a diameter smaller than the diameter of the swirl chamber, and in this form of invention, the fluid carrying passageways are formed by two or more apertures 35. These apertures are drilled partly into the reduced portion 33 and enter the swirl chamber at positions within the inside diameter of the flange 31. These apertures are spirally arranged so as to project the fluid under pressure into the swirl chamber in a tangential manner.

From the foregoing, it will be obvious that as the fluid under presure is caused to swirl in the chamber or cup 23 having its apex at the bottom of and in the center of the cup. The annular spaces within the cup between the grooves at the corner 36 where the inner surface of the flange 31 meets and joins the end face of the head will therefore, not be under normal pressure and will provide substantially quiescent areas where foreign matter which has reached the nozzle will be collected, thus avoiding clogging of the orifice 16. Furthermore, since the swirl member is movable axially when no pressure exists in the nozzle, any foreign matter which has accumulated in the nozzle body or in the fluid passageways will become dislodged by such axial movement. Moreover, since the swirl member is permitted to rotate initially only as it is being moved toward and on to its seat, such rotative movement will cause the face surface to the flange 24 to be effectively seated against the adjacent face of the nozzle disc 15 thereby sealing the head and causing all of the fluid under pressure to be projected through the passageways.

While I have shown but two forms of my invention, I do not wish to be limited to the embodiment herein shown and described, but reserve the rights to make detailed changes within the scope of the appended claim.

What I claim is:

A spray nozzle comprising a body having a cylindrical chamber opened at one end for connection to a source of supply and having a flat end wall at the opposite end formed with a central spray orifice, and a cylindrical swirl-producing member movable axially within the chamber and itself having at the orifice end thereof an upstanding annular wall defining a cup the rim of which bears upon the end wall in sealing contact therewith, the bottom of the cup being substantially parallel to the opposing end wall surface and defining therewith and with the annular wall relatively shallow circular swirl chamber, the periphery of the cylindrical member being formed with plural spiral grooves each of a depth substantially equal to that of the thickness of the annular wall to afford an opening through at the annular wall into the swirl chamber of major capacity, such major openings being in the form of lateral slanting slots to minimize the rotative urge of the fluid passing therethrough, said cylindrical member having a body of substantially greater extent than the depth of the swirl chamber, and said spiral grooves having a pitch insufficient to create a rotative urge upon the member of a degree capable of overcoming the inertia of the body and the friction in the contact between the annular wall and said end wall, whereby the member will remain quiescent to augment the swirl of the fluid in the swirl chamber.

HAROLD HOPPER.

References Cited in the file of this patent:

UNITED STATES PATENTS

| Number | Name | Date |
| --- | --- | --- |
| 1,166,340 | Erickson | Dec. 28, 1915 |
| 1,453,161 | Murphy et al. | Apr. 24, 1923 |
| 1,580,246 | Heller | Apr. 13, 1926 |
| 1,670,831 | Turley et al. | May 22, 1928 |

FOREIGN PATENTS

| Number | Country | Date |
| --- | --- | --- |
| 347,985 | France | Jan. 24, 1905 |
| 401,567 | France | July 30, 1909 |